(12) United States Patent
Unuma et al.

(10) Patent No.: US 10,852,718 B2
(45) Date of Patent: Dec. 1, 2020

(54) EQUIPMENT LIFE DIAGNOSTIC DEVICE

(71) Applicant: Hitachi, Ltd., Tokyo (JP)

(72) Inventors: Munetoshi Unuma, Tokyo (JP); Norio Takeda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 234 days.

(21) Appl. No.: 15/747,624

(22) PCT Filed: Sep. 24, 2015

(86) PCT No.: PCT/JP2015/076935
§ 371 (c)(1),
(2) Date: Jan. 25, 2018

(87) PCT Pub. No.: WO2017/051456
PCT Pub. Date: Mar. 30, 2017

(65) Prior Publication Data
US 2018/0224840 A1 Aug. 9, 2018

(51) Int. Cl.
*G05B 23/02* (2006.01)
*G05B 19/418* (2006.01)
(Continued)

(52) U.S. Cl.
CPC ............ *G05B 23/02* (2013.01); *G05B 19/418* (2013.01); *G07C 3/00* (2013.01); *G07C 3/02* (2013.01);
(Continued)

(58) Field of Classification Search
CPC ............ G05B 19/4065; G05B 23/0283; G05B 19/418; G05B 23/02; G07C 3/00; G07C 5/02
See application file for complete search history.

(56) References Cited

U.S. PATENT DOCUMENTS 6,453,731 B1 9/2002 Yaegashi
2005/0005186 A1* 1/2005 Goebel ................ G06Q 10/06
714/1
(Continued)

FOREIGN PATENT DOCUMENTS

EP 1 018 449 A2 7/2000
GB 2 419 333 A 3/2005
(Continued)

OTHER PUBLICATIONS

International Search Report (PCT/ISA/210) issued in PCT Application No. PCT/JP2015/076935 dated Nov. 24, 2015 with English translation (five pages).
(Continued)

Primary Examiner — Mohamed Charioui
(74) Attorney, Agent, or Firm — Crowell & Moring LLP

(57) ABSTRACT

Provided is an equipment life diagnostic device which assists in estimating operating conditions that are factors in determining the remaining life of equipment. This equipment life diagnostic device is provided with: an actual life consumption calculation unit which calculates the actual life consumption of equipment when the equipment is operating; an assumed life consumption setting unit which sets an assumed life consumption on the basis of the useful life of the equipment; a comparison unit which compares the actual life consumption calculated by the actual life consumption calculation unit with the assumed life consumption set by the assumed life consumption setting unit; and an output unit which, on the basis of the comparison result obtained from the comparison unit, displays information relating to the amount by which the actual life consumption is greater or less than the assumed life consumption.

8 Claims, 7 Drawing Sheets

(51) Int. Cl.
*G07C 3/00* (2006.01)
*G07C 3/02* (2006.01)
*G07C 5/02* (2006.01)

(52) U.S. Cl.
CPC ............ G07C 5/02 (2013.01); *G05B 23/0283* (2013.01); *G05B 2219/2619* (2013.01); *G05B 2219/39247* (2013.01); *Y02P 90/02* (2015.11)

(56) References Cited

U.S. PATENT DOCUMENTS

| | | | |
|---|---|---|---|
| 2005/0143956 A1* | 6/2005 | Long | G05B 19/4065 |
| | | | 702/184 |
| 2006/0287841 A1 | 12/2006 | Hoshi et al. | |
| 2009/0138211 A1* | 5/2009 | Gobrecht | F01K 13/00 |
| | | | 702/34 |
| 2011/0137575 A1* | 6/2011 | Koul | G05B 23/0245 |
| | | | 702/34 |
| 2012/0330500 A1 | 12/2012 | Kamada et al. | |
| 2015/0227658 A1* | 8/2015 | Persson | G05B 23/0243 |
| | | | 703/2 |

FOREIGN PATENT DOCUMENTS

| | | |
|---|---|---|
| JP | 58-12447 B2 | 3/1983 |
| JP | 8-335103 A | 12/1996 |
| JP | 2000-205925 A | 7/2000 |
| JP | 2002-73155 A | 3/2002 |
| JP | 2005-98988 A | 4/2005 |
| JP | 2006-155199 A | 6/2006 |
| JP | 2009-146443 A | 7/2009 |
| JP | 2012-72630 A | 4/2012 |

OTHER PUBLICATIONS

Japanese-language Written Opinion (PCT/ISA/237) issued in PCT Application No. PCT/JP2015/076935 dated Nov. 24, 2015 (four pages).

* cited by examiner

EQUIPMENT LIFE DIAGNOSTIC DEVICE

TECHNICAL FIELD

The present invention relates to an equipment life diagnostic device for diagnosing a life consumption state of equipment.

BACKGROUND ART

A mechanical device, an electric device, or plant equipment needs to be operated under appropriate operating conditions or maintained at appropriate timings in order to be used as long as its set or assumed life limit. A conventional technique described in PTL 1 has been known as a conventional technique for assisting an operator to set operating conditions or maintenance timings.

According to the conventional technique, a transition of rupture probability per operating plan under different operating conditions is evaluated for equipment and individual members configuring a plant on the basis of remaining life evaluation information at a current time and a predicted future remaining life calculated by the operating plan, and the evaluation result is multiplied by a weight coefficient per damage form of the equipment and the individual members thereby to calculate a transition of a plant risk value. If an upper limit of the plant risk value is set, the operator can determine appropriate operating conditions or maintenance timings on the basis of the calculated transition of the plant risk value.

CITATION LIST

Patent Literature

PTL 1: JP 2002-73155 A

SUMMARY OF INVENTION

Technical Problem

A mechanical device, an electric device, or plant equipment is in various operating states in use. The operating states have various degrees of effects on the remaining life. Thus, if an operator can estimate an operating state as a factor in determining the remaining life, appropriate operating conditions can be reliably determined. To the contrary, it is difficult for the operator to estimate an operating state as a factor in determining the remaining life on the basis of the transition of the rupture probability or the transition of the plant risk value according to the conventional technique.

The present invention is therefore directed to provide an equipment life diagnostic device for assisting in estimating an operating state as a factor in determining the remaining life of equipment.

Solution to Problem

In order to solve the above problem, an equipment life diagnostic device according to the present invention includes: an actual life consumption calculation unit for calculating actual life consumption that equipment consumes in operation; an assumed life consumption setting unit for setting assumed life consumption depending on a use life of the equipment; a comparison unit for comparing the actual life consumption calculated by the actual life consumption calculation unit and the assumed life consumption set by the assumed life consumption setting unit; and an output unit for displaying information on the amount by which the actual life consumption is higher or lower than the assumed life consumption on the basis of a comparison result of the comparison unit.

Advantageous Effects of Invention

According to the present invention, an operator of equipment grasps the amount by which actual life consumption is higher or lower than assumed life consumption, thereby easily estimating an operating state as a factor in determining the remaining life of the equipment.

Other problems, configurations, and effects will be made apparent by the following description of embodiments.

DESCRIPTION OF EMBODIMENTS

Figure 1:
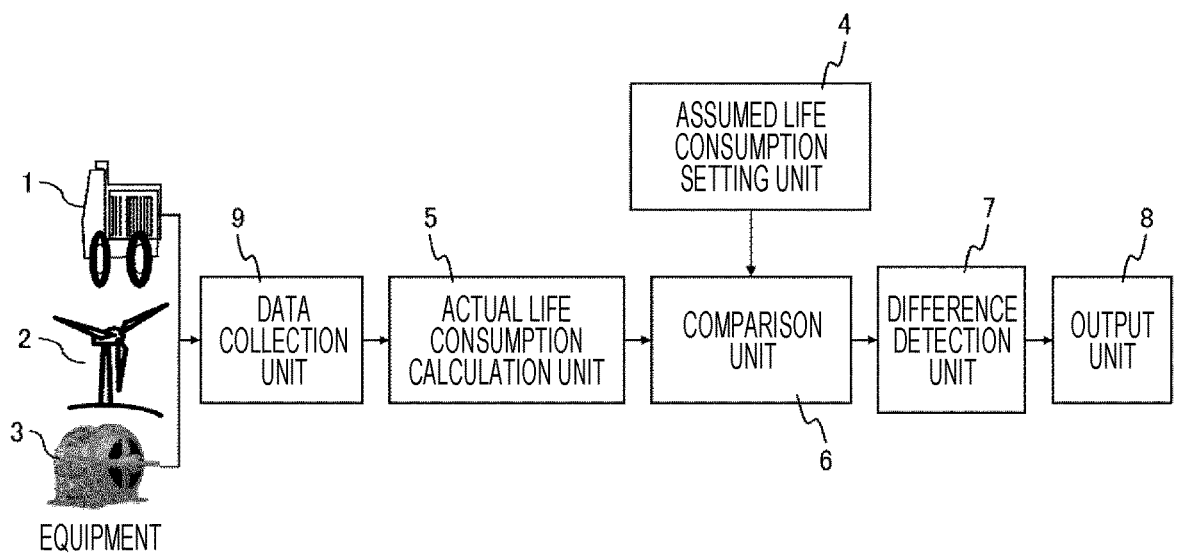
FIG. 1 is a functional block diagram illustrating a configuration of an equipment life diagnostic device according to a first embodiment of the present invention.

Embodiments of the present invention will be described below with reference to the drawings. The same reference numerals denote the same components or components comprising similar functions in each Figure.

First Embodiment

FIG. 1 is a functional block diagram illustrating a configuration of an equipment life diagnostic device according to a first embodiment of the present invention. According to the first embodiment, actual life consumption that equipment operating under actual circumstances consumes is compared with preset assumed life consumption to output information on the amount by which the actual life consumption is higher or lower than the assumed life consumption. According to the first embodiment, a calculation processing device such as microcomputer executes a predetermined program to function as each unit (4 to 9).

As illustrated in FIG. 1, equipment whose life is to be diagnosed is any of a dump truck 1, a windmill 2, and a rotating electrical machine 3 (power generator or motor). Equipment whose life is to be diagnosed is not limited to the above, and may be equipment which changes in physical property at the manufacture and reaches its life limit due to equipment operation or temporal change such as material damage caused by stress fatigue or abrasion of mechanical parts, insulative deterioration in electric parts, property deterioration in electric devices, or deterioration in transmissivity of optical parts, or a plant configured of a plurality of pieces of equipment.

A data collection unit 9 collects data used for calculating life consumption or physical amount data on life consumption from various sensors provided in target equipment (1, 2, 3). The sensors may employ sensors for directly measuring a life of a material such as distortion gauge for measuring stress of a structure of the dump truck 1 or the windmill 2, or various sensors for measuring a degree of insulative deterioration of the rotating electrical machine 3. Further, the data collection unit 9 may collect data from a sensor for detecting an equipment running operation or behavior (such as behavior of the body of the dump truck 1), or control data of the equipment. In this case, an equipment operating state is recognized by use of the running operation, the body behavior data, or the control data, and a fatigue damage is estimated on the basis of the recognized operating state. The fatigue damage is proportional to a consumed life, and thus the consumed life can be estimated on the basis of the fatigue damage. That is, the life consumption can be calculated on the basis of the running operation, the body behavior data, or the control data.

Equipment whose life is to be diagnosed will be assumed as dump truck 1 for simplicity in the following description. A life of the equipment is a fatigue life of the structure of the dump truck 1.

An actual life consumption calculation unit 5 calculates actual life consumption that the dump truck 1 in operation consumes by use of the data collected by the data collection unit 9. The actual life consumption is a value of a life consumed per unit time. A specific example of the calculation means is as follows. At first, an amplitude of closed stress is extracted and a wavelength of the stress is extracted on the basis of time history data of the stress measured by a distortion gauge in a well-known cycle count method (such as rainflow method). A situation of a stress damage, to which a material of a structure is subjected per unit time, is indicated by overlapped closed stress coexisting at the same time. Here, a stress damage per unit time indicates a progress speed at which a material is broken due to repeated stress. That is, a time when the stress damage per unit time is integrated and a material is broken is the life of the material. Thus, the value of the stress damage to which the material is subjected per unit time is actual life consumption.

An assumed life consumption setting unit 4 sets assumed life consumption that equipment whose life is to be diagnosed consumes during operation. Here, the assumed life consumption is life consumption per unit time which is assumed to meet the use life (amortization period) preset for the dump truck 1, for example.

A comparison unit 6 compares the assumed life consumption set by the assumed life consumption setting unit 4 with the actual life consumption calculated by the actual life calculation unit 5.

A difference detection unit 7 detects the amount by which the actual life consumption is higher or lower than the assumed life consumption on the basis of the comparison result of the comparison unit 6.

An output unit 8 outputs the detection result of the difference detection unit 7 in a predetermined form such as image display.

Figure 2:
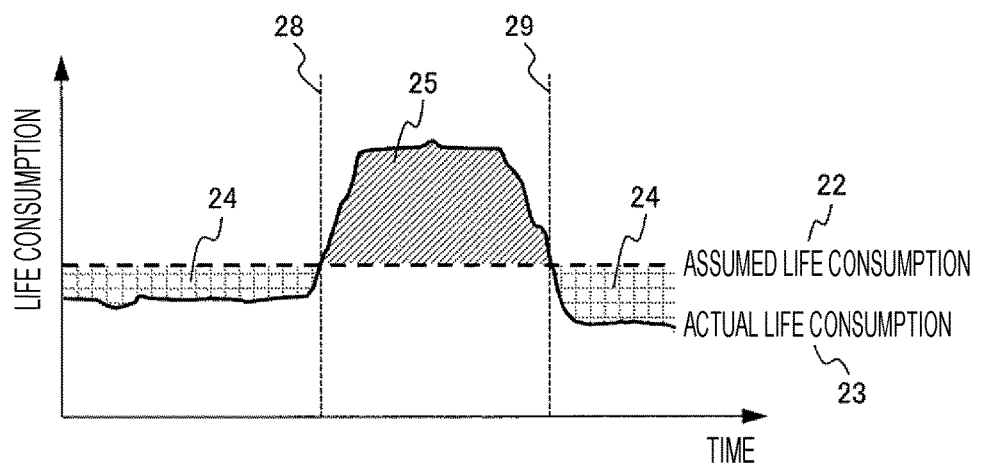
FIG. 2 illustrates an exemplary image display of a detection result.

FIG. 2 illustrates an exemplary image display of a detection result. The exemplary display illustrates a temporal change of a life which the dump truck 1 consumes per unit time while traveling, or life consumption. The horizontal axis indicates an elapsed time and the vertical axis indicates life consumption. Here, the life consumption in FIG. 2 indicates life consumption at a predetermined site (such as suspension) in the dump truck structure. The reference numerals in FIG. 2 are denoted for description, and the illustrated part other than the reference numerals is the exemplary image display (which is similarly applicable to other exemplary display).

A solid curve and a broken line in FIG. 2 indicate actual life consumption 23 and assumed life consumption 22, respectively. In FIG. 2, the road on which the dump truck travels changes at time points 28 and 29, the life consumption is low on the road before the time point 28, the life consumption is high between the time point 28 and the time point 29 due to an influence of unevenness of the road, and the life consumption is low again on the road after the time point 29. Thus, the actual life consumption 23 is lower than the assumed life consumption 22 before the time point 28, higher between the time point 28 and the time point 29, and lower after the time point 29.

The magnitudes of the actual life consumption 23 and the assumed life consumption 22 are compared (calculated) by the comparison unit 6 at each time point during traveling, and the amount by which the actual life consumption 23 is higher or lower than the assumed life consumption 22 is detected by the difference detection unit 7 on the basis of the comparison result. When the difference detection unit 7 detects that the actual life consumption 23 is lacking, or when the actual life consumption 23 is lower than the assumed life consumption 22, the output unit 8 hatches a region 24 between the line indicating the assumed life consumption 22 and the curve indicating the actual life consumption 23 in a predetermined pattern on the display screen. Further, when the difference detection unit 7 detects that the actual life consumption 23 is excessive, or when the actual life consumption 23 is higher than the assumed life consumption 22, the output unit 8 hatches a region 25 between the line 22 indicating the assumed life consumption 22 and the curve indicating the actual life consumption 23 in a predetermined pattern different from the hatching of the region 24 on the display screen. Thereby, the amount by which the actual life consumption 23 is higher or lower than the assumed life consumption 22 can be easily grasped.

From the display of FIG. 2, it can be determined that the actual life consumption 23 is lower than the assumed life consumption 22 in the traveling periods before the time point 28 and after the time point 29 and thus loads on the structure of the dump truck 1 can be increased, and it can be seen that the running operation can be performed to increase the life consumption or the road can be set to be less maintained. Further, since the actual life consumption 23 is higher than the assumed life consumption 22 in the traveling period between the time points 28 and 29, it can be determined that loads on the structure of the dump truck 1 need to be decreased, and it can be seen that the running operation of decreasing the life consumption is required and the road needs to be more maintained. The actual life consumption of the dump truck 1 is made close to the assumed life consumption in this way, thereby meeting the use life of the dump truck 1.

Figure 3:
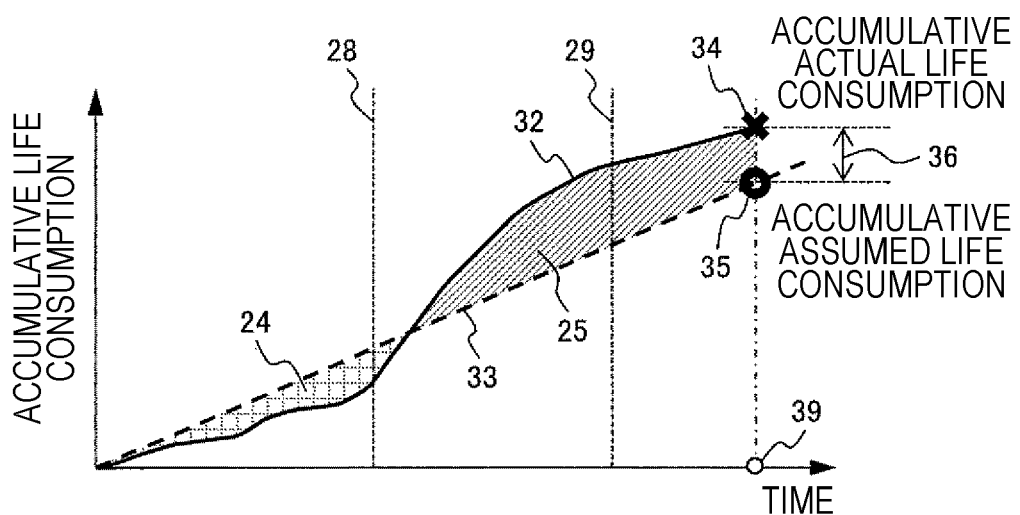
FIG. 3 illustrates other exemplary image display of a detection result.

FIG. 3 illustrates other exemplary image display of a detection result. The exemplary display of FIG. 3 illustrates a temporal change of accumulative life consumption to which each life consumption illustrated in FIG. 2 is integrated on the temporal axis. The horizontal axis indicates an elapsed time and the vertical axis indicates accumulative life consumption in FIG. 3. One working period of the dump truck 1 is between the start point and a time point 39 on the horizontal axis.

In FIG. 3, a solid curve 32 and a broken line 33 indicate accumulative actual life consumption as accumulated actual life consumption (FIG. 2) and accumulative assumed life consumption as accumulated assumed life consumption (FIG. 2), respectively. The accumulative actual life consumption and the accumulative assumed life consumption are calculated by the comparison unit 6 on the basis of the actual life consumption calculated by the actual life consumption calculation unit 5 and the assumed life consumption set by the assumed life consumption setting unit 4.

The tilt of the accumulative actual life consumption is smaller than the tilt of the accumulative assumed life consumption between the start point and the time point 28 in FIG. 3, and thus the accumulative actual life consumption is lower than the accumulative assumed life consumption and a difference between the accumulative assumed life consumption and the accumulative actual life consumption increases over time. After the time point 28, however, the tilt of the accumulative actual life consumption is larger than the tilt of the accumulative assumed life consumption, and thus the accumulative actual life consumption indicates a higher value than the accumulative assumed life consumption for awhile after the time point 28. The tilt of the accumulative actual life consumption is smaller after the time point 29, but the accumulative actual life consumption changes over time while keeping over the accumulative assumed life consumption. Consequently, a value 34 of the accumulative actual life consumption is higher than a value 35 of the accumulative assumed life consumption at the time point 39 as the end point of one working period of the dump truck 1.

The magnitudes of the accumulative actual life consumption and the accumulative assumed life consumption are compared (calculated) by the comparison unit 6 at each time point in one working period, and the amount by which the accumulative actual life consumption is higher or lower than the accumulative assumed life consumption is detected by the difference detection unit 7 on the basis of the comparison result. When the difference detection unit 7 detects that the accumulative actual life consumption is lacking, or when the accumulative actual life consumption is lower than the accumulative assumed life consumption, the output unit 8 hatches the region 24 between the line indicating the accumulative assumed life consumption and the curve indicating the accumulative actual life consumption in a predetermined pattern on the display screen. Further, when the difference detection unit 7 detects that the accumulative actual life consumption is excessive, or when the accumulative actual life consumption is higher than the accumulative assumed life consumption, the output unit 8 hatches the region 25 between the line indicating the accumulative assumed life consumption and the curve indicating the accumulative actual life consumption in a predetermined pattern different from the hatching of the region 24 on the display screen. Thereby, the amount by which the accumulative actual life consumption is higher or lower than the accumulative assumed life consumption can be easily confirmed.

From the display of FIG. 3, the value 34 of the accumulative actual life consumption is higher than the value 35 of the accumulative assumed life consumption at the time point 39 when the working cycle ends, and thus it can be determined that the operating state needs to reduce the total loads on the structure of the dump truck 1 in one working period in order to meet the use life. Therefore, it can be seen that the running operation of reducing the life consumption or the maintenance of the road needs to be more performed.

Figure 4:
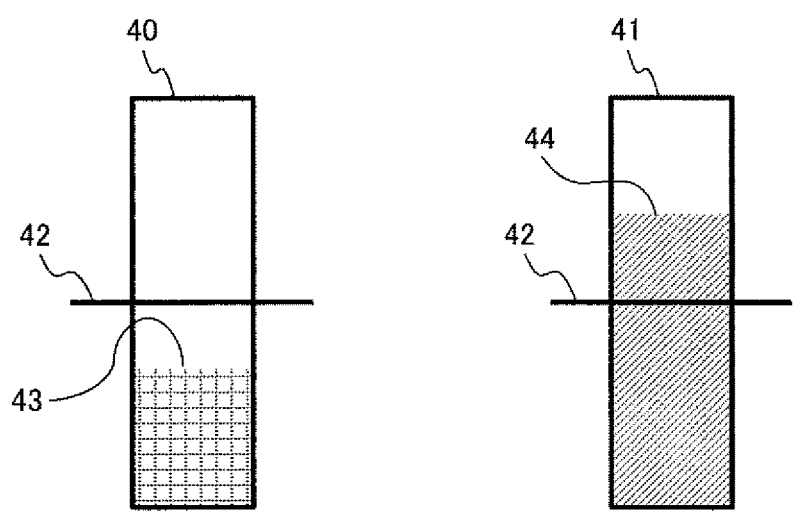
FIG. 4 illustrates other exemplary image display of a detection result.

FIG. 4 illustrates other exemplary image display of a detection result. The exemplary display indicates instantaneous values of the actual life consumption and the assumed life consumption illustrated in FIG. 2.

A bar with a predetermined pattern 43 in a frame 40 indicates an instantaneous value of the actual life consumption as in the left part of FIG. 4. Therefore, the height of the bar changes depending on a temporal change of the actual life consumption as illustrated in FIG. 2. The assumed life consumption at a constant value is indicated in a horizontal line 42 drawn at the height of the frame 40 corresponding to the constant value. The left part of FIG. 4 displays a time point when the actual life consumption is lower than the assumed life consumption, where the bar of the predetermined pattern 43 is lower than the horizontal line 42.

The right part of FIG. 4 displays a time point when the actual life consumption is higher than the assumed life consumption, where the bar indicating the actual life consumption is higher than the horizontal line 42 indicating the assumed life consumption. Here, the pattern of the bar is changed to a pattern 44 different from the pattern 43 in the left part or when the actual life consumption is lower than the assumed life consumption. Thereby, the amount by which the actual life consumption is higher or lower than the assumed life consumption can be easily grasped similarly to the exemplary display of FIG. 2.

An effect on the life consumption by a running operation or road state at a current time can be known by use of the display of FIG. 4. Thereby, a running operation can be adjusted to increase or decrease loads on the structure of the dump truck 1 in order to meet the use life.

The display of FIG. 4 can be applied also to the accumulative life consumption as illustrated in FIG. 3. In this case, an instantaneous value of the accumulative actual life consumption may be normalized with reference to an instantaneous value of the accumulative assumed life consumption.

As described above, with the equipment life diagnostic device according to the first embodiment, actual life consumption of target equipment is compared with assumed life consumption, the amount by which the actual life consumption is higher or lower than the assumed life consumption is detected on the basis of the comparison result to display the detection result, thereby assisting an operator of the target equipment to estimate an operating state as a factor in determining the remaining life of the device or equipment. Further, actual life consumption, assumed life consumption, and the amount by which the actual life consumption is higher or lower than the assumed life consumption are displayed, thereby reliably confirming an effect of a current operating condition on the use life (amortization period). Further, the operating conditions are adjusted to reduce the difference in the actual life consumption detected according to the first embodiment, thereby reliably meeting the use life (amortization period).

The display form of the output unit 8 is not limited to the image display, and can employ various forms such as characters, speech, and printed material.

Second Embodiment

Figure 5:
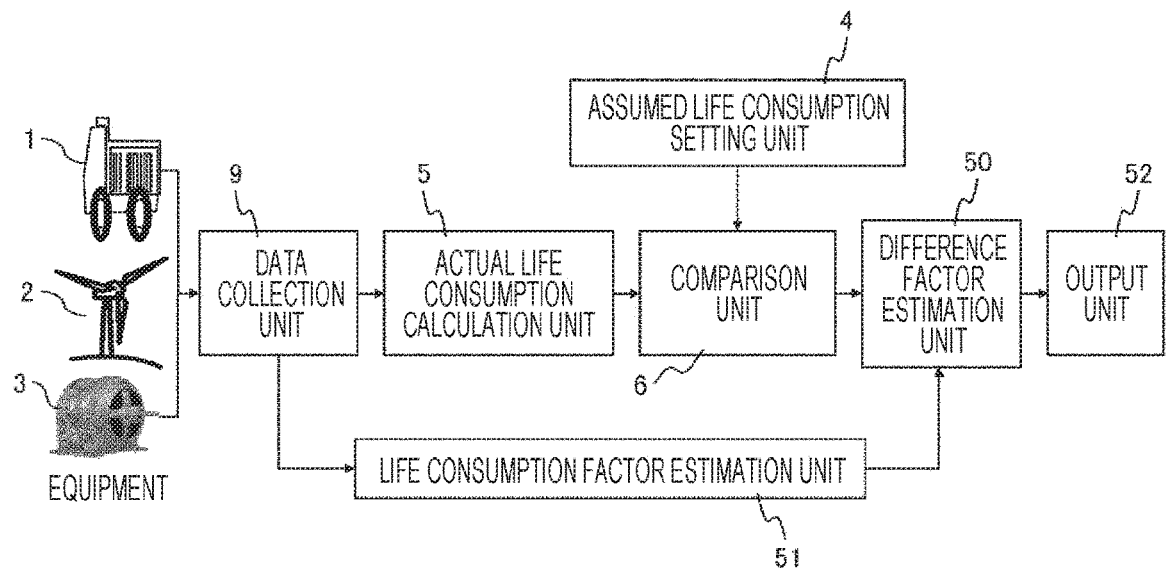
FIG. 5 is a functional block diagram illustrating a configuration of the equipment life diagnostic device according to a second embodiment of the present invention.

FIG. 5 is a functional block diagram illustrating a configuration of an equipment life diagnostic device according to a second embodiment of the present invention. Different points from the first embodiment will be mainly described below.

The amount by which the actual life consumption is higher or lower than the assumed life consumption is detected on the basis of a comparison result between the assumed life consumption and the actual life consumption according to the first embodiment, but the equipment life diagnostic device according to the second embodiment estimates a factor of a difference by a life consumption factor estimation unit 51 and a difference factor estimation unit 50 illustrated in FIG. 5.

The life consumption factor estimation unit 51 estimates a factor by which target equipment consumes its life by use of the data collected by the data collection unit 9, or the physical amount data on the life consumption of the target equipment (1, 2, 3). An exemplary factor estimation means extracts a period in which the target equipment deteriorates on the basis of the data collected by the target equipment, and estimates a factor of an occurrence of the deterioration period. When a plurality of deterioration factors is present in parallel at the same time, a contribution rate of each factor is estimated by use of the contribution rates of the occurrence factors. Here, "deterioration" indicates a magnitude of fatigue damage of the target equipment, or deterioration in performance of an electric material. An Accumulative fatigue damage as accumulated fatigue damage indicates a progress degree at which a material is broken due to stress fatigue. Therefore, a relationship of "deterioration=life consumption" is established, and thus an occurrence factor of the life can be estimated. Further, other exemplary factor estimation means classifies an operating state as element state by use of sensor data or control data collected from the target equipment. The characteristic amount of a preset element state is compared with the data collected from the equipment in operation, and the operating state is classified into the element state. Thereby, a factor by which the target equipment consumes its life can be estimated.

Figure 6:
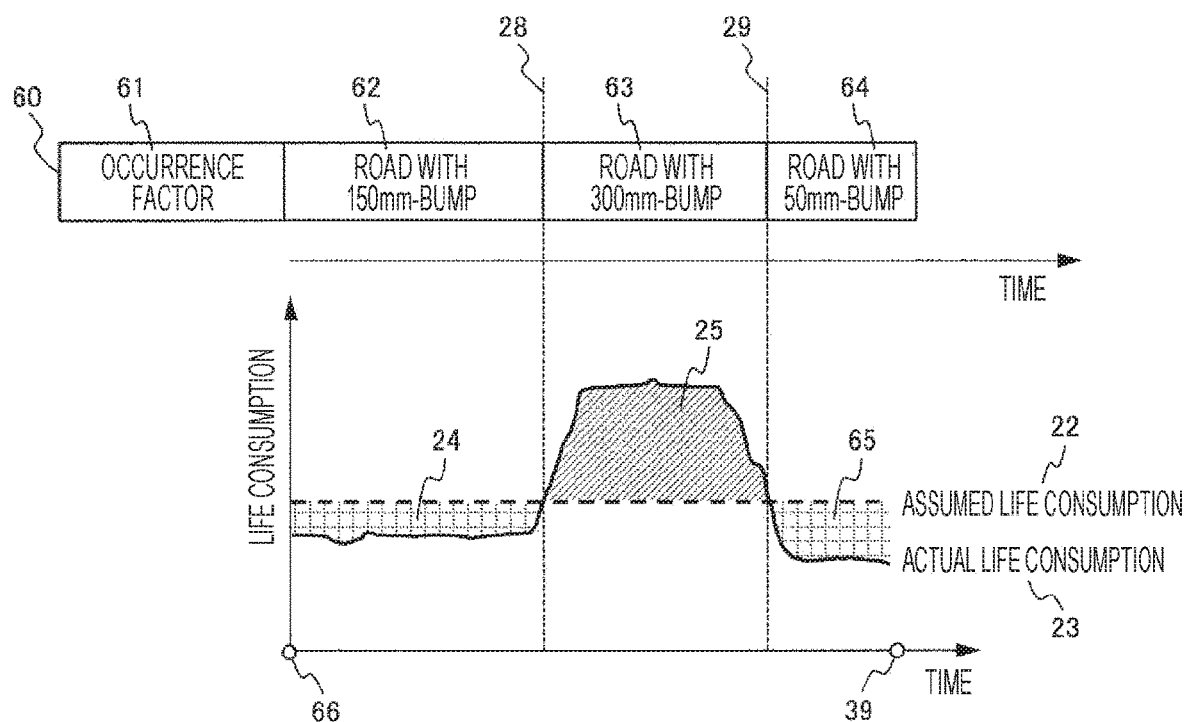
FIG. 6 illustrates an exemplary image display of a factor estimation result by a life consumption factor estimation unit.

FIG. 6 illustrates an exemplary image display of a factor estimation result by the life consumption factor estimation unit 51. In the exemplary display, the life consumption that the dump truck 1 consumes while traveling and the factor estimation result by the life consumption factor estimation unit 51 are displayed on the same time axis. In the exemplary display, a factor estimation result 60 by the life consumption factor estimation unit 51 is added to the exemplary display according to the first embodiment illustrated in FIG. 2. Other exemplary means described above is employed for the factor estimation means, and the operations while the dump truck is traveling are classified into a plurality of element operations.

Here, the element operations are classified by a size of a bump (unevenness) on the road. Data in which a plurality of element operation items or sizes of bumps on the road are associated with magnitudes of damages subjected to the target equipment is previously set. The life consumption factor estimation unit 51 estimates, as a factor, an element operation item associated with the closest damage to the magnitude of the damage indicated by the data collected from the dump truck 1 in operation from among the element operation items (sizes of bumps) in the data with reference to the data. In the exemplary display of FIG. 6, the road subjected to a damage corresponding to a 150 mm-bump, the road subjected to a damage corresponding to a 300 mm-bump, and the road subjected to a damage corresponding to a 50 mm-bump are estimated as occurrence factors 62, 63, and 64, respectively.

The difference factor estimation unit 50 in FIG. 5 performs a processing of associating the comparison result between the assumed life consumption and the actual life consumption by the comparison unit 6 with the estimation result by the life consumption factor estimation unit 51. According to the second embodiment, the region 24 in which the actual life consumption 23 is lower than the assumed life consumption 22, the region 25 in which the actual life consumption 23 is higher than the assumed life consumption 22, and a region 65 in which the actual life consumption 23 is lower than the assumed life consumption 22 are associated with the estimation results 62 (road with a 150 mm-bump), 63 (road with a 300 mm-bump), and 64 (road with a 50 mm-bump), respectively, as illustrated in FIG. 6. The association results are output by an output unit 52 in a predetermined form such as image display. One of the forms is the exemplary image display illustrated in FIG. 6.

The difference factor estimation unit 50 has a function similar to the difference detection unit 7 according to the first embodiment (FIG. 1). Thereby, the actual life consumption (22), the assumed life consumption (23), the amount by which the actual life consumption (22) is higher or lower than the assumed life consumption (22) (the hatching patterns in the regions 24, 25, 65), and the occurring life consumption factor estimation result (60) can be displayed in parallel in time series as illustrated in FIG. 6.

With the display form, the dump truck 1 is largely damaged on the road with a 300 mm-bump in the region 25 in FIG. 6, for example, and thus it can be seen that the actual life consumption is much higher than the assumed life consumption. It can be seen that a frequency to maintain the road needs to be lower than the current state in the working periods corresponding to the regions 24 and 65 in which the actual life consumption is lacking and the road situation needs to be improved in the working period corresponding to the region 25 in which the actual life consumption is excessive in order to make the actual life consumption close to the assumed life consumption in all the working periods illustrated in FIG. 6.

Also in the second embodiment, the display is enabled by use of the accumulative actual life consumption and the accumulative assumed life consumption as in the first embodiment (FIG. 3). In this case, it is possible to determine a frequency to maintain the road or an improvement in road situation depending on the amount by which the accumulative actual life consumption is higher or lower than the accumulative assumed life consumption.

Figure 7:
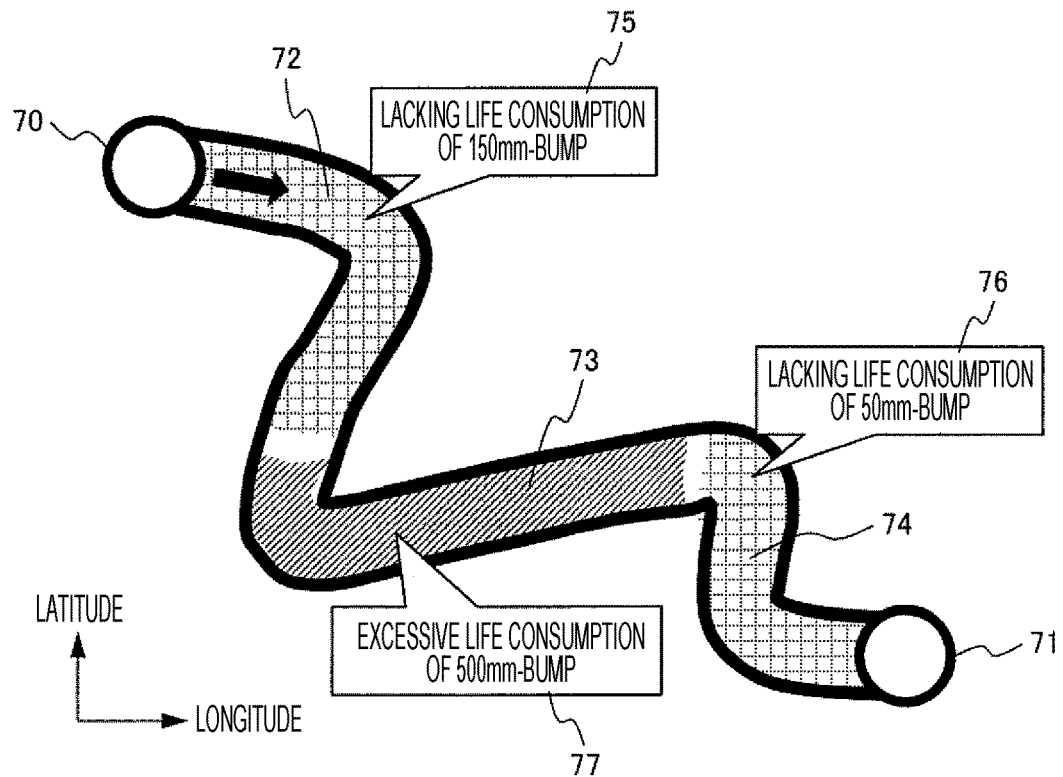
FIG. 7 illustrates other exemplary image display of a factor estimation result.

FIG. 7 illustrates other exemplary image display of a factor estimation result. A factor estimation result is associated with position information to be displayed in the exemplary display.

As illustrated in FIG. 7, map display is used in which the horizontal direction is assumed as longitude direction and the vertical direction is assumed as latitude direction. Points 70 and 71 in the map display are positions of the dump truck 1 at an initial time point 66 and a final time point 36 in FIG. 6, respectively. A bold double curve connecting the two points (70, 71) indicates a movement trajectory of the dump truck. The position information of the dump truck 1 is acquired by a positioning device such as GPS provided on the dump truck 1. When the position information is acquired, time information is also acquired together with the position information and the acquired time information is stored in a storage device (not illustrated) together with the position information.

The information illustrated in FIG. 6, or the information on the actual life consumption, the assumed life consumption, the amount by which the actual life consumption is higher or lower than the assumed life consumption, and the life consumption factor estimation result is associated with the position information on the basis of the time information. Thereby, the display as illustrated in FIG. 7 is enabled. The movement periods of the dump truck corresponding to regions 72, 73, and 74 in FIG. 7 correspond to the regions 24, 25, and 65 in FIG. 6, respectively. Also in FIG. 7, a hatching pattern is changed depending on a difference in the actual life consumption similarly as in FIG. 2. Balloons 75, 76, and 77 are used to display a difference in the actual life consumption and a life consumption factor estimation result. The information on a difference in the actual life consumption and a life consumption factor estimation result is associated with the position information, thereby specifying a place in which the life is excessively consumed or a place in which the life consumption is low on the working path.

As described above, with the equipment life diagnostic device according to the second embodiment, the similar effects to the first embodiment can be obtained, and a life consumption factor is estimated thereby to assist an operator of target equipment to estimate an operating state as a factor in determining the remaining life of the device or equipment. Thereby, the operating conditions can be adjusted to reduce a difference in the actual life consumption, thereby reliably meeting the use life (amortization period).

Third Embodiment

Figure 8:
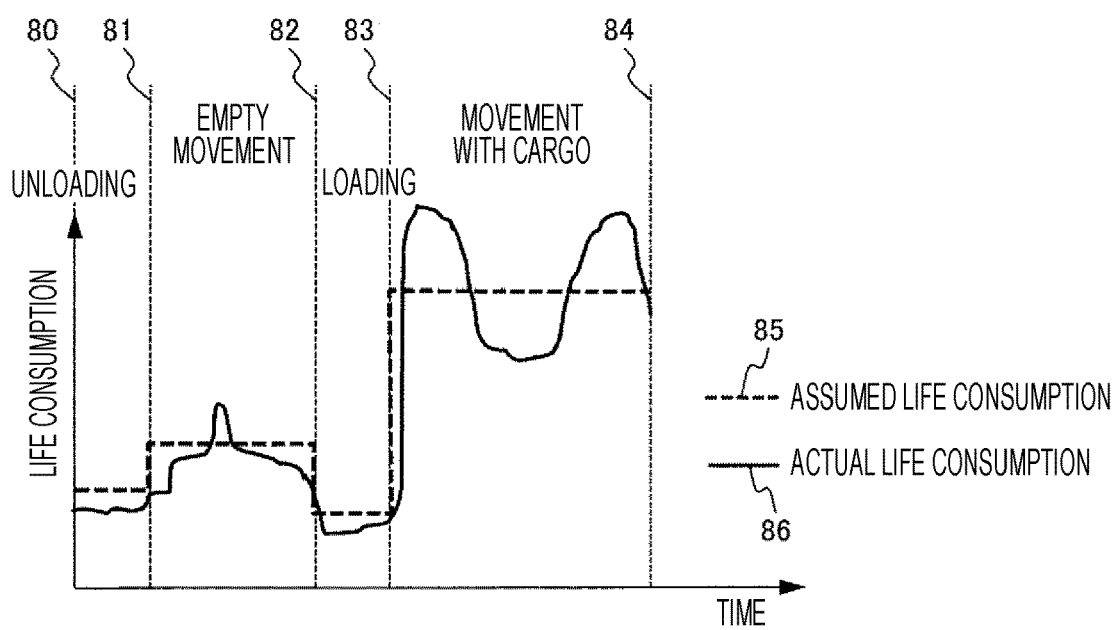
FIG. 8 illustrates an exemplary image display of a detection result by the equipment life diagnostic device according to a third embodiment of the present invention.

FIG. 8 illustrates an exemplary image display of a detection result by an equipment life diagnostic device according to a third embodiment of the present invention. The configuration of the equipment life diagnostic device is similar to that of the first embodiment (FIG. 1).

Different points from the first embodiment will be mainly described below.

The life consumption is displayed in one working period (movement working period of the dump truck) in the exemplary display (FIG. 2) according to the first embodiment, while the life consumption is displayed in one entire working cycle according to the third embodiment.

FIG. 8 illustrates life consumption in one working cycle of the dump truck. One working cycle of the dump truck is configured of "unloading," "empty movement," "loading," and "movement with cargo" in the working order and the working cycle is repeated. Thus, the working cycle of the dump truck is defined from the start of unloading to the end of movement with cargo (or a next unloading start time). In FIG. 8, an unloading start time point 80 is the start of one working cycle, the unloading period is between the unloading start time point 80 and a time point 81, the empty movement period is between the time point 80 and a time point 82, the loading period is between the time point 82 and a time point 83, and the movement-with-cargo period is between the time point 83 and a time point 84. The time point 84 is a movement-with-cargo end time (or a next unloading start time), or the end of one working cycle. The assumed life consumption in a broken line 85 is set per working period. The assumed life consumption is compared with the actual life consumption in a solid line 86 thereby to determine when a difference in the actual life consumption is caused in which working period. The movement periods (empty movement, movement with cargo) of the dump truck are assumed as one working period according to the third embodiment, but may be subdivided into element operations as in FIG. 6. A movement trajectory of one entire working cycle may be displayed in association with the position information as in FIG. 7.

Figure 9:
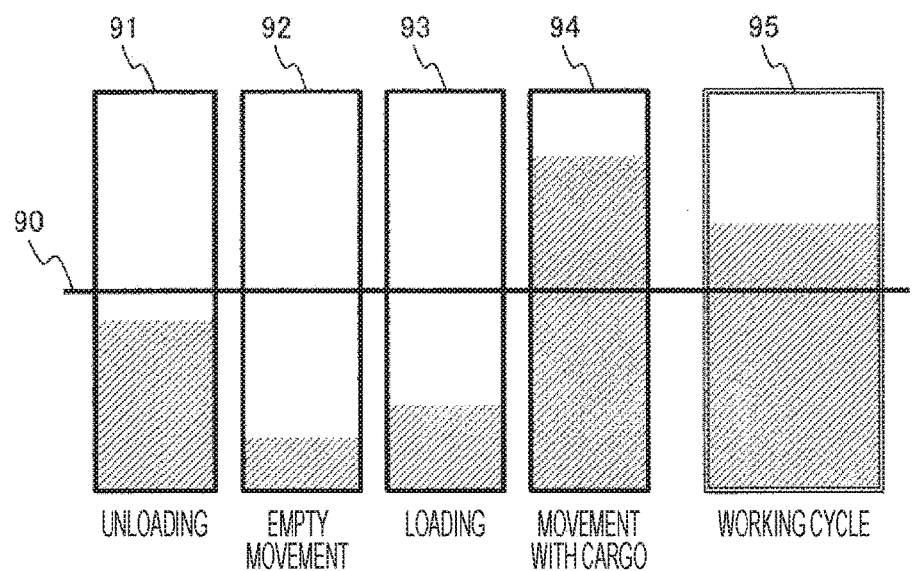
FIG. 9 illustrates other exemplary image display of a detection result according to the third embodiment.

FIG. 9 illustrates other exemplary image display of a detection result according to the third embodiment.

A bar with a predetermined pattern in a frame indicates an instantaneous value of the actual life consumption similarly as in the exemplary display of FIG. 4. Further, the accumulative actual life consumption and the accumulative assumed life consumption are displayed per working period in the exemplary display. The accumulative assumed life consumption is indicated in a horizontal line 90. An instantaneous value of the accumulative actual life consumption is normalized with reference to an instantaneous value of the accumulative assumed life consumption.

The bars in the frames 91, 92, 93, and 94 indicate the accumulative actual life consumption on the unloading work, the accumulative actual life consumption on the empty movement work, the accumulative actual life consumption on the loading work, and the accumulative actual life consumption on the movement-with-cargo work, respectively. A bar in a frame 95 indicates the accumulative actual life consumption in one entire working cycle.

The accumulative actual life consumption in one entire working cycle is higher than the accumulative assumed life consumption in the exemplary display of FIG. 9. The accumulative actual life consumption is equal to or lower than the accumulative assumed life consumption in the working periods other than the movement-with-cargo period, and thus it can be seen that a life consumption factor occurring in the movement-with-cargo work needs to be searched. The life consumption factor can be estimated according to the second embodiment.

According to the third embodiment, the similar effects to the first embodiment can be obtained, and the operating conditions can be adjusted to reduce a difference in the actual life consumption in an entire working cycle of target equipment, thereby reliably meeting the use life (amortization period).

Fourth Embodiment

Figure 10:
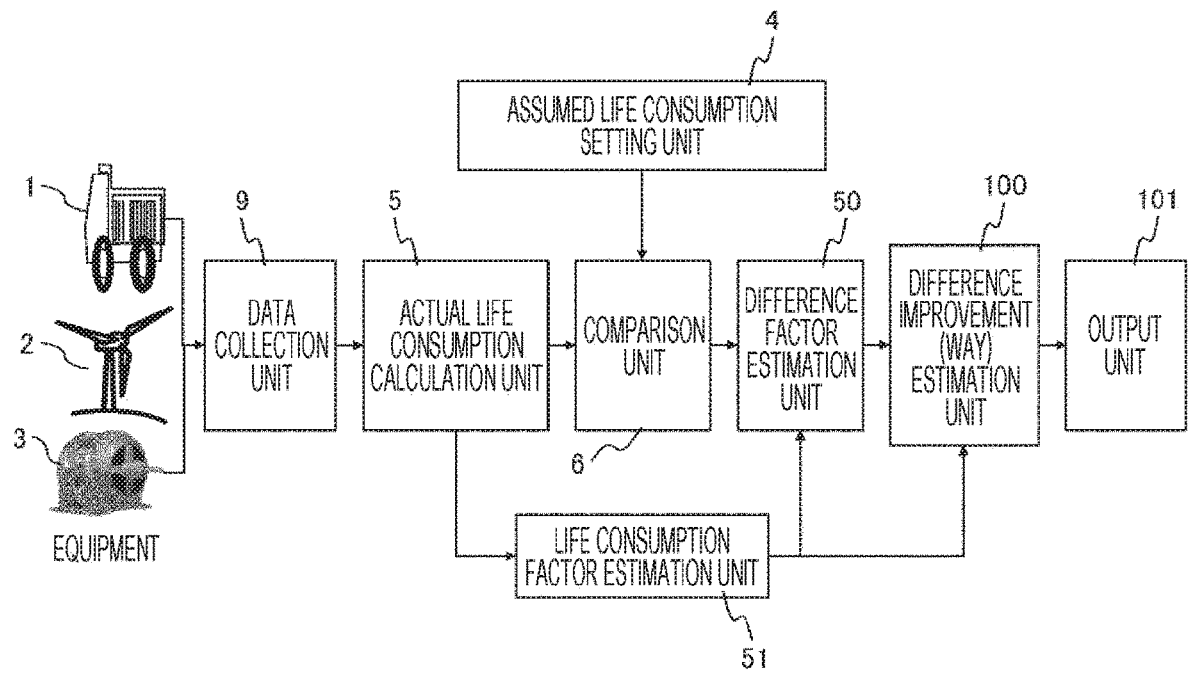
FIG. 10 is a functional block diagram illustrating a configuration of the equipment life diagnostic device according to a fourth embodiment of the present invention.

FIG. 10 is a functional block diagram illustrating a configuration of an equipment life diagnostic device according to a fourth embodiment of the present invention. A way to improve a factor of a difference in the actual life consumption is output according to the fourth embodiment.

Different points from the second embodiment will be mainly described below.

According to the fourth embodiment, a difference improvement (way) estimation unit 100 is added behind the difference factor estimation unit 50 according to the second embodiment (FIG. 5). Further, an output unit 101 has a function of outputting an estimated improvement (way).

The difference improvement (way) estimation unit 100 estimates an improvement (way) for improving a difference factor estimated by the difference factor estimation unit 50 and making the actual life consumption close to the assumed life consumption.

Data used by the improvement (way) estimation unit 100 for estimating an improvement (way) will be described herein. The data is previously stored in a storage device (not illustrated) provided in the equipment life diagnostic device according to the fourth embodiment.

Figure 11:
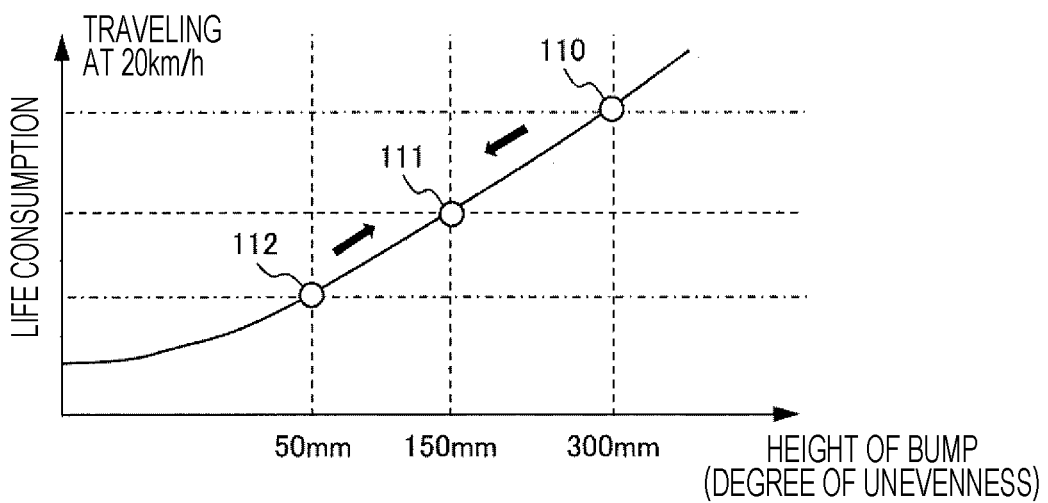
FIG. 11 illustrates an exemplary data used for estimating an improvement (way).

FIG. 11 illustrates an exemplary data used for estimating an improvement (way). FIG. 11 illustrates a relationship between the height of a bump and the life consumption when the movement speed of the dump truck is at 20 km/h. The road with a 300 mm-bump is illustrated as a difference factor for the region 25 in which the life is excessively consumed in FIG. 6. If the movement speed of the dump truck is at 20 km/h at that time, the region 25 in FIG. 6 corresponds to a point 110 in FIG. 11. Here, if the assumed life consumption corresponds to a point 111 in FIG. 11, the height of the bump is reduced to 150 mm by road maintenance thereby to make the actual life consumption close to the assumed life consumption. The road with a 50 mm-bump is illustrated as a difference factor for the region 65 in which the life consumption is lacking in FIG. 6. That is, the region 65 in FIG. 6 corresponds to a point 112 in FIG. 11. Therefore, it can be seen that the road does not need to be maintained to a height of 150 mm of the bump on the road in order to make the actual life consumption close to the assumed life consumption.

The difference improvement (way) estimation unit 100 estimates an improvement (way) for making the actual life consumption close to the assumed life consumption depending on the difference factor estimated by the difference factor estimation unit 50 on the basis of the data in FIG. 11. The output unit 101 then outputs the improvement (way) estimated by the improvement (way) estimation unit 100 in a predetermined display form such as image display. For example, if the difference factor estimation unit 50 estimates the road with a 300 mm-bump as a factor by which the life is excessively consumed at a movement speed of 20 km/h of the dump truck, the difference improvement (way) estimation unit 100 estimates "a height of 150 mm of the bump" as an improvement (way). The output unit 101 then displays that the height of the bump is to be reduced to 150 mm. The output unit 101 may display a difference improvement (way) together with a difference factor in the image display in FIG. 6 and FIG. 7.

Figure 12:
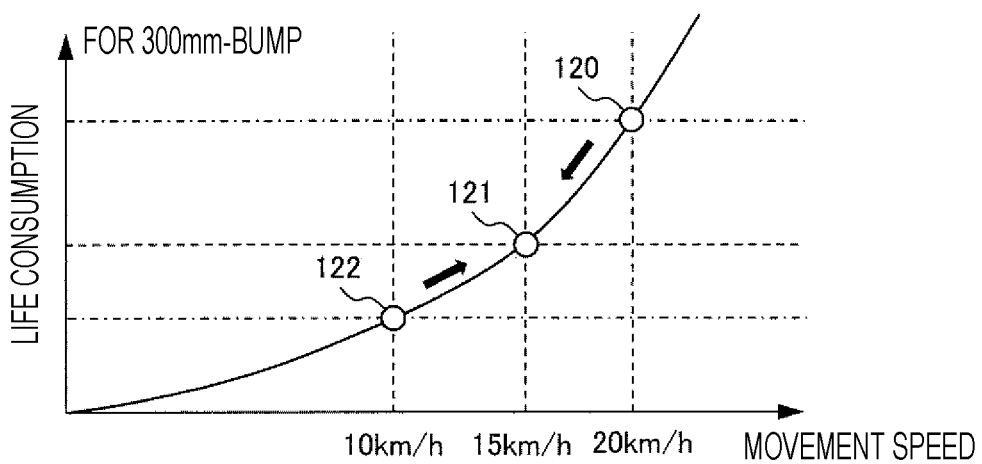
FIG. 12 illustrates other exemplary data used for estimating an improvement (way).

FIG. 12 illustrates other exemplary data used for estimating an improvement (way). FIG. 12 illustrates a relationship between a movement speed of the dump truck and its life consumption on the road with a 300 mm-bump. A point 120 in FIG. 12 corresponds to the point 110 in FIG. 11. The life consumption at a point 121 in FIG. 12 corresponds to the assumed life consumption.

It can be seen from the data of FIG. 12 that when the road with a 300 mm-bump is estimated as a factor of excessive life consumption while the dump truck travels at 20 km/h, the actual life consumption can be made close to the assumed life consumption if the movement speed is reduced to 15 km/h. It can be seen that when the road with a 300 mm-bump is estimated as a factor of lacking life consumption while the dump truck travels at 10 km/h, the actual life consumption can be made close to the assumed life consumption if the movement speed is increased to 15 km/h.

Though not illustrated, an improvement (way) for a lacking life consumption factor in the region 65 in FIG. 6 can be estimated by the similar data on the road with a 50 mm-bump to FIG. 12. For example, assuming that the movement speed at which the assumed life consumption is obtained is at 40 km/h when the movement speed of the dump truck is at 20 km/h and the road with a 50 mm-bump is estimated as a lacking life consumption factor, the actual life consumption can be made close to the assumed life consumption if the movement speed is increased to 40 km/h.

The difference improvement (way) estimation unit 100 estimates an improvement (way) for making the actual life consumption close to the assumed life consumption depending on a difference factor estimated by the difference factor estimation unit 50 on the basis of the data of FIG. 12. The output unit 101 then outputs the improvement (way) estimated by the improvement (way) estimation unit 100 in a predetermined display form such as image display or character display. For example, when the difference factor estimation unit 50 estimates that a factor by which the life is excessively consumed is the road of a 300 mm-bump while the movement speed of the dump truck is at 20 km/h, the difference improvement (way) estimation unit 100 estimates a "movement speed of 15 km/h" as an improvement (way). The output unit 101 then displays that the movement speed is to be reduced to 15 km/h. The output unit 101 may display a difference improvement (way) together with a difference factor in the image display in FIG. 6 and FIG. 7.

As described above, with the equipment life diagnostic device according to the fourth embodiment, the similar effects to the first and second embodiments can be obtained, and an improvement (way) for making the actual life consumption close to the assumed life consumption is estimated depending on a difference factor, thereby easily adjusting the operating conditions to reduce a difference in the actual life consumption. Thereby, the use life (amortization period) can be reliably met.

The improvement (way) estimated by the data of FIG. 11 enables a difference in the life consumption to be reduced while a constant movement speed or working efficiency is kept. The improvement (way) estimated by the data of FIG. 11 enables a difference in the life consumption to be rapidly reduced during a work. A plurality of items of the data of FIG. 11 may be used with the movement speed as a parameter, or a plurality of items of the data of FIG. 12 may be used with the height of a bump as a parameter. The data of FIG. 11 and FIG. 12 may be used together.

Fifth Embodiment

Figure 13:
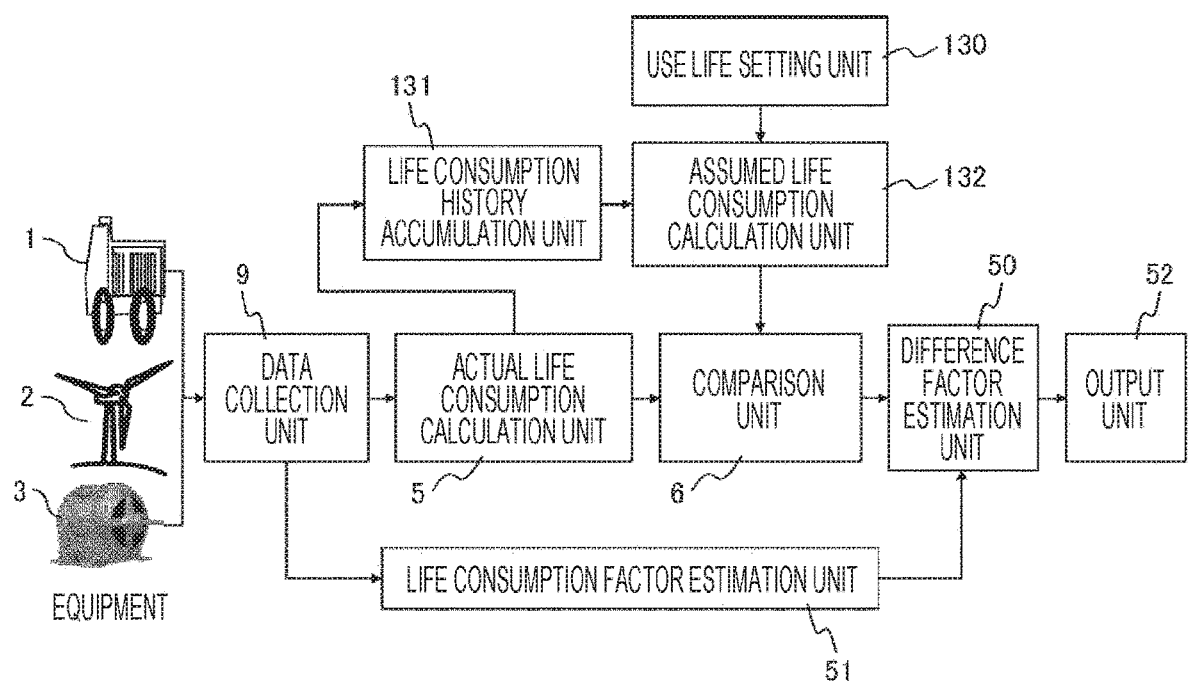
FIG. 13 is a functional block diagram illustrating a configuration of the equipment life diagnostic device according to a fifth embodiment of the present invention.

FIG. 13 is a functional block diagram illustrating a configuration of an equipment life diagnostic device according to a fifth embodiment of the present invention. According to the fifth embodiment, assumed life consumption is calculated on the basis of a use life (amortization period) of equipment and a history of life consumption calculated by the actual life consumption calculation unit 5.

Different points from the second embodiment will be mainly described below.

In the equipment life diagnostic device illustrated in FIG. 13, the assumed life consumption setting unit 4 according to the second embodiment (FIG. 5) is configured of a use life setting unit 130, a life consumption history accumulation unit 131, and an assumed life consumption calculation unit 132. The configuration can be applied to other embodiments.

The use life setting unit 130 sets a use life (amortization period) of equipment which is stored in a storage device (not illustrated) in an assumed life consumption calculation processing. Here, the use life (amortization period) may be an actual time from purchase to discard, or may be a total operating time in which equipment can be actually used.

The life consumption history accumulation unit 131 accumulates a temporal history of life consumption calculated by the actual life consumption calculation unit 5.

The assumed life consumption calculation unit 132 calculates assumed life consumption on the basis of the use life (amortization period) of the equipment set by the use life setting unit 130 and the temporal history of the life consumption accumulated by the life consumption history accumulation unit 131, and outputs the calculated value to the comparison unit 6.

An assumed life consumption calculation means will be described below.

FIG. 14 illustrates a temporal change in life consumption rate indicated on the basis of the use life (amortization period) and the life consumption history. Here, the life consumption rate is a value indicating a progress degree of life consumption assuming a time when equipment reaches its life limit as 1.

A time point 140 corresponds to a current time in FIG. 14. A temporal change in life consumption rate from the start of equipment use to a current time is indicated in a line (solid line) from the start of use (origin in FIG. 14) to the current time point 140 on the basis of the life consumption history. If the life consumption rate indicated in the line is extrapolated, the value 1 is reached at a time point 142 as indicated in a broken line. The use life corresponds to a time point 141, and thus it is predicted from the extrapolation result that the life is consumed before the use life limit. Thus, the assumed life consumption calculation unit 132 calculates and sets the assumed life consumption such that the life of the equipment is prolonged to the use life limit.

The assumed life consumption calculation unit 132 calculates the life consumption rate at a current time on the basis of the temporal history of the life consumption accumulated by the life consumption history accumulation unit 131. Further, the assumed life consumption calculation unit 132 calculates the assumed life consumption such that the life consumption rate reaches 1 when the use life expires or the remaining life at a current time is consumed when the use life expires. In FIG. 14, the assumed life consumption calculated by the assumed life consumption calculation unit 132 corresponds to a tilt of a line 143 (solid line) from the current point 140 to the use life limit point 141 assuming that the life consumption rate is 1 at the use life limit point 141. That is, the value of the assumed life consumption calculated by the assumed life consumption calculation unit 132 and used after a current time is lower than the values set to date. Thereby, the operating conditions of the equipment can be adjusted such that the life of the equipment is prolonged to the use life limit.

With the equipment life diagnostic device according to the fifth embodiment, the similar effects to the first and second embodiments can be obtained, and the assumed life consumption can be automatically adjusted while the life consumption history is always or periodically monitored, thereby adjusting the operating conditions of the equipment such that the life of the equipment reliably expires around the use life limit.

The present invention is not limited to the aforementioned embodiments, and encompasses various modifications. For example, the aforementioned embodiments are described in detail for explaining the present invention in a comprehensible way, and are not necessarily limited to one comprising all the described components. Further, part of the configuration of each embodiment may be added with, deleted, or replaced with other configuration.

REFERENCE SIGNS LIST

1 Dump truck
2 Windmill
3 Rotating electric machine
4 Assumed life consumption setting unit
5 Actual life consumption calculation unit
6 Comparison unit
7 Difference detection unit
8 Output unit
9 Data collection unit
50 Difference factor detection unit
51 Life consumption factor estimation unit
52 Output unit
100 Difference improvement (way) estimation unit
101 Output unit
130 Use life setting unit
131 Life consumption history accumulation unit
132 Assumed life consumption calculation unit

The invention claimed is:

1. An equipment life diagnostic device comprising:
an actual life consumption calculation unit for calculating actual life consumption that equipment consumes in operation;
an assumed life consumption setting unit for setting assumed life consumption depending on a use life of the equipment;
a comparison unit for comparing the actual life consumption calculated by the actual life consumption calculation unit and the assumed life consumption set by the assumed life consumption setting unit;
an output unit for displaying information on the amount by which the actual life consumption is higher or lower than the assumed life consumption on the basis of a comparison result of the comparison unit;
wherein the information includes a first information having a first display pattern in a case in which the amount by which the actual life consumption is lower than the assumed life consumption and a second information having a second display pattern that is different from the first display pattern in a case in which the amount by which the actual life consumption is higher than the assumed life consumption; and
a life consumption factor estimation unit for classifying equipment operating conditions into elemental states, setting an expected life consumption for each of the elemental states, and comparing the expected life consumption with the actual life consumption to estimate a life consumption factor for each of the elemental states;
wherein the output unit displays an estimated life consumption and an actual life consumption for each life consumption factor.

2. The equipment life diagnostic device according to claim 1,
wherein the output unit displays each temporal change of the actual life consumption and the assumed life consumption, and the amount by which the actual life consumption is higher or lower than the assumed life consumption.

3. The equipment life diagnostic device according to claim 1, wherein the output unit displays each instantaneous value of the actual life consumption and the assumed life consumption.

4. An equipment life diagnostic device comprising:
an actual life consumption calculation unit for calculating actual life consumption that equipment consumes in operation;
an assumed life consumption setting unit for setting assumed life consumption depending on a use life of the equipment;
a comparison unit for comparing the actual life consumption calculated by the actual life consumption calculation unit and the assumed life consumption set by the assumed life consumption setting unit;
an output unit for displaying information on the amount by which the actual life consumption is higher or lower than the assumed life consumption on the basis of a comparison result of the comparison unit;
wherein the information includes a first information having a first cross-hatch display pattern in a case in which the amount by which the actual life consumption is lower than the assumed life consumption and a second information having a second cross-hatch display pattern that is different from the first cross-hatch display pattern in a case in which the amount by which the actual life consumption is higher than the assumed life consumption; and
a difference factor estimation unit for estimating a factor of the amount by which the actual life consumption is higher or lower than the assumed life consumption on the basis of the comparison result;
wherein the output unit displays the factor estimated by the difference factor estimation unit together with each temporal change of the actual life consumption and the assumed life consumption.

5. An equipment life diagnostic device comprising:
an actual life consumption calculation unit for calculating actual life consumption that equipment consumes in operation;
an assumed life consumption setting unit for setting assumed life consumption depending on a use life of the equipment;
a comparison unit for comparing the actual life consumption calculated by the actual life consumption calculation unit and the assumed life consumption set by the assumed life consumption setting unit;
an output unit for displaying information on the amount by which the actual life consumption is higher or lower than the assumed life consumption on the basis of a comparison result of the comparison unit;
wherein the information includes a first information having a first cross-hatch display pattern in a case in which the amount by which the actual life consumption is lower than the assumed life consumption and a second information having a second cross-hatch display pattern that is different from the first cross-hatch display pattern in a case in which the amount by which the actual life consumption is higher than the assumed life consumption; and
a difference factor estimation unit for estimating a factor of the amount by which the actual life consumption is higher or lower than the assumed life consumption on the basis of the comparison result.

6. The equipment life diagnostic device according to claim 5,
wherein the output unit displays the factor estimated by the difference factor estimation unit together with map information.

7. The equipment life diagnostic device according to claim 5, further comprising:
a difference improvement estimation unit for estimating a difference improvement for making the actual life consumption close to the assumed life consumption on the basis of the factor estimated by the difference factor estimation unit.

8. The equipment life diagnostic device according to claim 1,
wherein the assumed life consumption setting unit comprises:
a use life setting unit for setting the use life;
a life consumption history accumulation unit for accumulating a temporal history of the actual life consumption calculated by the actual life consumption calculation unit; and
an assumed life consumption calculation unit for calculating the assumed life consumption on the basis of the use life set by the use life setting unit and the temporal history of the actual life consumption accumulated by the life consumption history accumulation unit, and outputting it to the comparison unit.

* * * * *